United States Patent
Elgala et al.

(10) Patent No.: US 10,491,305 B2
(45) Date of Patent: Nov. 26, 2019

(54) SYSTEM AND METHOD FOR EMBEDDING PHASE AND AMPLITUDE INTO A REAL-VALUED UNIPOLAR SIGNAL

(71) Applicant: Trustees of Boston University, Boston, MA (US)

(72) Inventors: Hany Elgala, Niskayuna, NY (US); Thomas D. C. Little, Newton, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 15/123,137

(22) PCT Filed: Mar. 3, 2015

(86) PCT No.: PCT/US2015/018404
§ 371 (c)(1),
(2) Date: Sep. 1, 2016

(87) PCT Pub. No.: WO2015/134437
PCT Pub. Date: Sep. 11, 2015

(65) Prior Publication Data
US 2017/0070298 A1    Mar. 9, 2017

Related U.S. Application Data

(60) Provisional application No. 61/949,532, filed on Mar. 7, 2014.

(51) Int. Cl.
*H04B 10/54* (2013.01)
*H04B 10/516* (2013.01)
(Continued)

(52) U.S. Cl.
CPC ......... *H04B 10/5161* (2013.01); *H04B 10/54* (2013.01); *H04B 10/541* (2013.01);
(Continued)

(58) Field of Classification Search
CPC ............. H04L 27/2697; H04L 27/2634; H04L 5/0007; H04B 10/541; H04B 10/5161; H04B 10/54; H04B 10/5561
(Continued)

(56) References Cited

U.S. PATENT DOCUMENTS 5,598,436 A * 1/1997 Brajal ................... H03F 1/3241
                                                      375/260
6,181,754 B1 * 1/2001 Chen ........................ H04B 1/30
                                                      375/325
(Continued)

OTHER PUBLICATIONS

Barrami et al, A novel FFT IFFT size efficient technique to generate real time optical OFDM signals compatible with IM DD systems, Oct 2013, IEEE, All Document.*
(Continued)

*Primary Examiner* — Dibson J Sanchez
(74) *Attorney, Agent, or Firm* — Iandiorio Teska & Coleman, LLP

(57) ABSTRACT

A system for embedding phase and amplitude into a real valued unipolar signal suitable for intensity modulation (IM) by optical transmitters. The system includes a complex-to-unipolar conversion engine configured to receive complex symbols in Cartesian format and convert the complex symbols from the Cartesian format to a polar coordinate format and generate real valued unipolar symbols including embedded phase and amplitude information of complex symbols in the Cartesian format.

9 Claims, 10 Drawing Sheets

(51) Int. Cl.
*H04B 10/556* (2013.01)
*H04L 27/26* (2006.01)
*H04L 5/00* (2006.01)

(52) U.S. Cl.
CPC ....... *H04B 10/5561* (2013.01); *H04L 5/0007* (2013.01); *H04L 27/2634* (2013.01); *H04L 27/2697* (2013.01)

(58) Field of Classification Search
USPC .................................. 398/43–103, 182–201
See application file for complete search history.

(56) References Cited

U.S. PATENT DOCUMENTS

| | | | |
|---|---|---|---|
| 6,236,687 B1* | 5/2001 | Caso | H04L 1/0057 375/327 |
| 6,889,347 B1 | 5/2005 | Adams et al. | |
| 2003/0063558 A1* | 4/2003 | Kim | H04L 27/2657 370/208 |
| 2005/0123061 A1 | 6/2005 | Smith et al. | |
| 2005/0271387 A1* | 12/2005 | Kee | H04B 10/2543 398/140 |
| 2006/0109891 A1 | 5/2006 | Guo et al. | |
| 2006/0140288 A1* | 6/2006 | Holden | H04L 27/24 375/260 |
| 2009/0129499 A1 | 5/2009 | Kwak et al. | |
| 2009/0175365 A1 | 7/2009 | Jun | |
| 2009/0180778 A1* | 7/2009 | Rhee | H04B 10/548 398/79 |
| 2009/0220239 A1* | 9/2009 | Armstrong | H04B 10/548 398/81 |
| 2010/0034542 A1* | 2/2010 | Armstrong | H04B 10/5053 398/158 |
| 2010/0142637 A1* | 6/2010 | Hu | H04L 25/03159 375/260 |
| 2010/0239267 A1* | 9/2010 | Kikuchi | H04L 27/2096 398/156 |
| 2011/0026924 A1* | 2/2011 | Chung | H04B 10/5055 398/79 |
| 2011/0236033 A1 | 9/2011 | Kikuchi | |
| 2012/0057872 A1* | 3/2012 | Freda | H04L 27/2602 398/76 |
| 2012/0087668 A1* | 4/2012 | Li | H04L 27/2628 398/79 |
| 2012/0134676 A1* | 5/2012 | Kikuchi | H04B 10/532 398/65 |
| 2012/0281988 A1* | 11/2012 | Kikuchi | H04B 10/5561 398/159 |
| 2014/0056583 A1* | 2/2014 | Giddings | H04L 27/2663 398/44 |
| 2014/0147117 A1* | 5/2014 | Kikuchi | H04B 10/2507 398/65 |
| 2015/0318925 A1* | 11/2015 | Tsonev | H04B 10/116 398/79 |
| 2016/0087740 A1* | 3/2016 | Yu | H04B 10/5563 398/76 |
| 2016/0099823 A1* | 4/2016 | Barrami | H04L 27/2096 375/260 |
| 2016/0112238 A1* | 4/2016 | Ling | H04B 10/50 375/261 |
| 2016/0226594 A1* | 8/2016 | Haas | H04B 10/516 |
| 2017/0222719 A1* | 8/2017 | Haas | H04B 10/116 |
| 2018/0062766 A1* | 3/2018 | Ooi | H04B 13/02 |
| 2018/0123851 A1* | 5/2018 | Mounzer | H04L 27/2618 |
| 2018/0302157 A1* | 10/2018 | Wei | H04B 10/07953 |

OTHER PUBLICATIONS

Moreolo, Power Efficient and Cost Effective Solutions for Optical OFDM Systems Using Direct Detection, Jul. 2010, ICTON, All Document.*

Written Opinion from the International Searching Authority for International Application No. PCT/US15/18404, dated Jun. 25, 2015, six (6) pages.

* cited by examiner

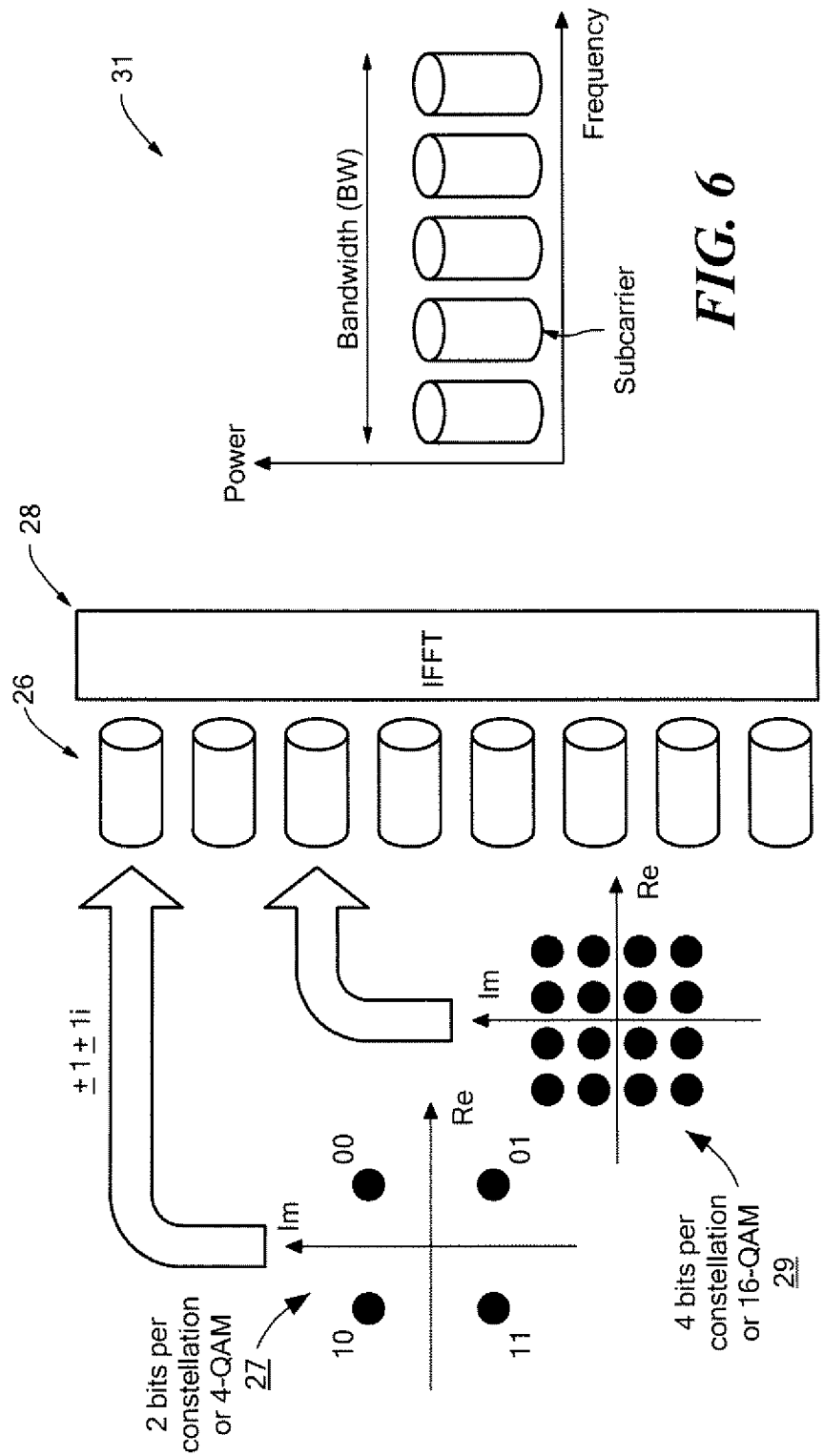

SYSTEM AND METHOD FOR EMBEDDING PHASE AND AMPLITUDE INTO A REAL-VALUED UNIPOLAR SIGNAL

RELATED APPLICATIONS

This application claims benefit of and priority to U.S. Provisional Application Ser. No. 61/949,532 filed Mar. 7, 2014 under 35 U.S.C. §§ 119, 120, 363, 365, and 37 C.F.R. § 1.55 and § 1.78 and is incorporated herein by this reference.

GOVERNMENT RIGHTS

This invention was made with Government support under Contract No. EEC-0812056 awarded by the National Science Foundation. The Government has certain rights in the invention.

FIELD OF THE INVENTION

This invention relates to a system and method for embedding phase and amplitude into a real-valued unipolar signal.

BACKGROUND OF THE INVENTION

A continuing need for increased data capacity in wired and wireless broadband data networks is being driven by growth in support applications such as on-demand, hi-definition television, cloud services, mobile applications and the like. This demand urges the development of new data capacity for such wired and wireless systems. Thus, there is a need to provide a more efficient and robust use of new or existing networks that use intensity modulation (IM) as a means of transmission and reception and which may use orthogonal frequency division multiplexing (OFDM). OFDM may be used in fiber optic communications, in free space optical wireless communications (OWC) systems (including Visible Light Communications (VLC)), and acoustic communications. OFDM represents one class of IM approaches. Fiber optic systems using IM are commonly found in broadband data distribution and access networks serving businesses, campuses, consumer homes, and the like. VLC, a form of OWC which uses IM, is a communications technique employing visible light in a free-space model and targets delivery of data from lights (luminaires) as wireless access points. Other forms of OWC that are applicable to this invention include other light spectra including infra-red and ultraviolet.

OFDM can achieve the needed robust high-capacity links discussed above because it offers high spectral efficiency, adequate bit loading, and power allocation per sub-carrier and simple frequency domain equalization. High data rates are supported through parallel transmission of high order multi-level quadrature amplitude modulation (QAM) symbols on orthogonal sub-carriers. In intensity modulation (IM) transmission using OFDM, the real-valued base band OFDM signals modulates the instantaneous power of the optical carrier that is detected using a photo detector.

Conventional radio frequency OFDM (RF-OFDM) signals are complex. That is, they include both real and imaginary parts. Therefore RF-OFDM signals cannot be directly used to modulate the instantaneous power of the optical carrier because only real and positive signals can be used to support intensity modulation.

There are several conventional solutions to address the problem of needing to generate real and positive signals from a complex OFDM signal in optical transmission. One solution, known as DC-biased optical OFDM (DCO-OFDM) creates real and bi-polar symbols and introduces a DC bias to shift bipolar symbols so that all the values of the symbol are positive. However, DCO-OFDM sacrifices 50% of the conventional RF-OFDM spectral efficiency because the quadrature amplitude modulation (QAM) constellations to the Inverse Fast Fourier Transform (IFFT) engine are constrained by Hermitian symmetry.

The bipolar nature of OFDM signals introduces an additional problem in VLC because LEDs can only convey unipolar signals in light intensity. A power efficient alternative to DCO-OFDM is asymmetrically clipped optical OFDM (ACO-OFDM) which eliminates DC biasing. ACO-OFDM uses properties of the Fourier Transform and asymmetrical clipping to create real and unipolar symbols in the time domain. Because ACO-OFDM uses only positive samples, it has one-half the spectral efficiency of DCO-OFDM and one-fourth the spectral efficiency of RF-OFDM.

The DCO-OFDM signal is real-valued and bipolar while the ACO-OFEM signal is real-valued and unipolar. However, some proportion of the spectral efficiency must be sacrificed to ensure real-valued signals from complex signals. The IFFT engine is the main operation to modulate orthogonal sub-carriers and generate time-domain OFDM samples used to modulate the LED intensity in IM. As discussed above, the spectral efficiency of DCO-OFDM is one-half of the spectral efficiency of RF-OFDM and the spectral efficiency ACO-OFDM is one-half the spectral efficiency of DCO-OFDM or one-fourth the spectral efficiency of RF-OFDM. This is because both of these techniques rely on a complex conjugate assignment, also called Hermitian symmetry, to get real values out of the QAM complex samples input to the IFFT engine. With Hermitian symmetry, half of the available sub-carriers are used to carry complex data QAM symbols while the other half carries redundant complex-conjugate of the complex data QAM symbols. In addition to Hermitian symmetry, ACO-OFDM uses only odd sub-carriers to carry data—the QAM constellations are assigned only to odd sub-carriers while even sub-carriers are assigned a zero value.

Other conventional techniques to generate unipolar OFDM symbols, such as Flip-OFDM (F-OFDM), position modulation OFDM (PM-OFDM), unipolar OFDM (U-OFDM), and pulse amplitude modulation discrete multitone (PAM-DMT) similarly have one-fourth the spectral efficiency of RF-OFDM.

BRIEF SUMMARY OF THE INVENTION

In one aspect, a system for embedding phase and amplitude into a real valued unipolar signal suitable for intensity modulation (IM) by optical transmitters is featured. A complex-to-unipolar conversion engine is configured to receive complex symbols in Cartesian format and convert the complex symbols from the Cartesian format to a polar coordinate format and generate real valued unipolar symbols including embedded phase and amplitude information of complex symbols in the Cartesian format.

In one embodiment, the complex symbols may include one or more of complex orthogonal frequency division multiplexing (OFDM) symbols or single-carrier frequency domain-equalization (SC-FDE). The complex-to-unipolar conversion engine may include a Cartesian-to-polar converter configured to convert the complex symbols from the Cartesian format to the complex symbols in polar coordinate format. The complex-to-unipolar conversion engine may include a phase and amplitude pre-equalizer responsive to the complex symbols in the polar format configured to set values of the phase and amplitude of individual samples of the complex symbols in the polar format in order to optimize bit error rate under dynamic range operation constraints at a predetermined data rate and output equalized amplitude and phase samples having the embedded amplitude and phase. The system may further include unipolar symbol generator responsive to the equalized amplitude and phase samples configured to generate the real valued unipolar symbols including the embedded amplitude and phase. The system may further include a data bit generator responsive to a data bit stream configured to generate bit symbols. The system may further include a quadrature amplitude modulator (QAM) responsive to the data bit symbols configured to generate QAM symbols. The system may include a phase-shift keying (PSK) modulator responsive to the data bit symbols configured to generate complex PSK symbols. The system may further include a mapper responsive to the QAM symbols configured to assign the QAM symbols to all sub-carriers to a Fourier Transform (IFFT) engine operation with no Hermitian symmetry to double the spectral efficiency. The system may include an inverse fast Fourier Transform (IFFT) engine responsive to the assigned QAM signals on sub-carriers configured to output complex OFDM symbols. The amplitudes of different samples of complex valued OFDM symbols are transmitted on one half of a period and phases of different samples of complex valued OFDM symbols are transmitted on the other half of the period. The system may include a mapper responsive to the QAM symbols configured to assign the QAM symbols only to even sub-carriers to a Fourier Transform (IFFT) engine operation with no Hermitian symmetry to double the spectral efficiency. The system may include an inverse fast Fourier Transform (IFFT) engine responsive to the assigned QAM signals to the even sub-carriers configured to output the complex symbols using half-wave even symmetry to reduce the time required to output the complex OFDM symbols. The system may include a digital-to-analog converter configured to convert the real valued unipolar OFDM symbols with the embedded phase and amplitude information to analog signals. The system may include an optical receiver including an analog-to-digital converter responsive to the analog signals configured to convert the analog signals to digital symbols representing the real valued unipolar OFDM symbols with the embedded phase and amplitude information. The system may include a unipolar-to-complex conversion engine configured to convert the symbols representing real valued unipolar OFDM symbols with embedded phase and amplitude information into complex OFDM symbols. The unipolar-to-complex conversion engine may include a polar-to-Cartesian engine configured to convert the samples representing the real valued unipolar symbols with embedded phase and amplitude information in the polar coordinate format to Cartesian format.

In another aspect, a system for embedding phase and amplitude into a real valued unipolar signal suitable for intensity modulation (IM) by optical transmitters is featured. A Cartesian-to-polar converter is configured to receive complex symbols in Cartesian format and convert the complex symbols from the Cartesian format to a polar coordinate format. A phase and amplitude pre-equalizer is responsive to the complex symbols in polar format configured to set the values of the phase and amplitude of individual samples of the complex symbols in the polar format in order to optimize bit error rate under dynamic range operation constraints at a predetermined data rate and output equalized amplitude and phase samples having embedded amplitude and phase information. A unipolar symbol generator is responsive to the equalized amplitude and phase samples in the polar format configured to construct the real-valued unipolar symbols including embedded amplitude and phase.

In another aspect, a method for embedding phase and amplitude into a real-valued unipolar signal suitable for intensity modulation (IM) by optical transmitters is featured. The method includes receiving complex symbols in Cartesian format, converting the complex symbols from the Cartesian format to a polar coordinate format, and generating real-valued unipolar symbols included in embedded phase and amplitude information of the complex symbols in Cartesian format.

In one embodiment, the method may include the step of setting values of the phase and amplitude of individual samples of the complex symbols in polar format in order optimize bit error rate under dynamic operation constraints and a predetermined rate and outputting equalized embedded amplitude and phase samples. The method may include the step of generating real-valued unipolar symbols included in embedded phase and amplitude from the equalized amplitude and phase samples.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 5 is a schematic block diagram showing an example of 4-QAM and 16-QAM constellations input to an IFFT engine;

FIG. 6 is a graph depicting the relationship between power, frequency, bandwidth and sub-carriers;

DETAILED DESCRIPTION OF THE INVENTION

Figure 1:
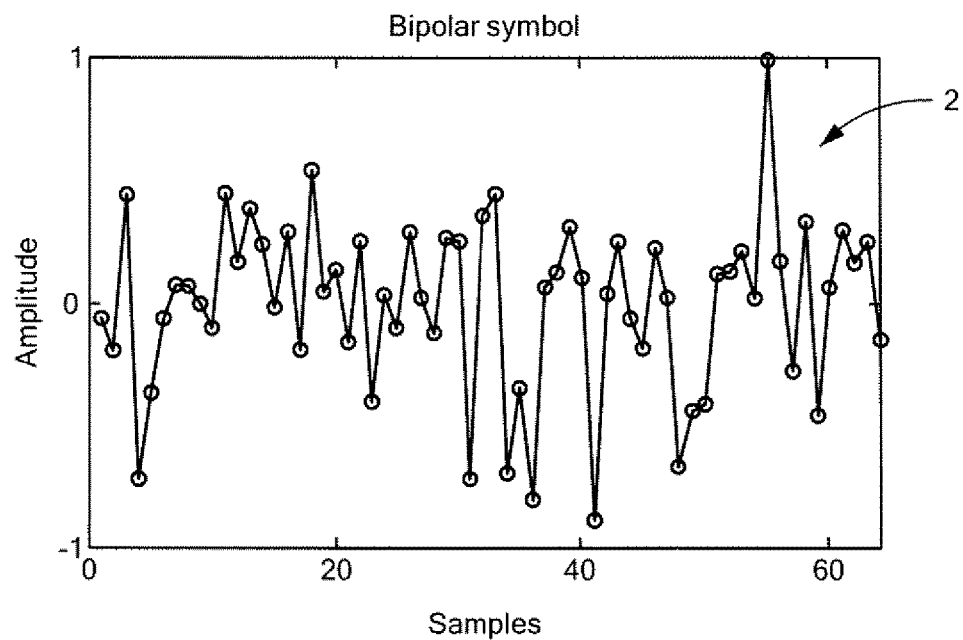
FIG. 1 is an example of a plot depicting a typical bipolar symbol.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the Background section above, there are several conventional solutions to addressing the problem of needing to generate real and positive signals from a complex OFDM signal in optical transmission. DCO-OFDM creates real and bipolar symbols, e.g., bipolar symbol 2, FIG. 1, and introduces a DC bias to shift the bipolar symbols so that all values of the symbols are positive. DCO-OFDM sacrifices 50% of the conventional RF-OFDM spectral efficiency because the QAM constellations to the IFFT engine 28 are constrained by Hermitian symmetry.

Figure 2:
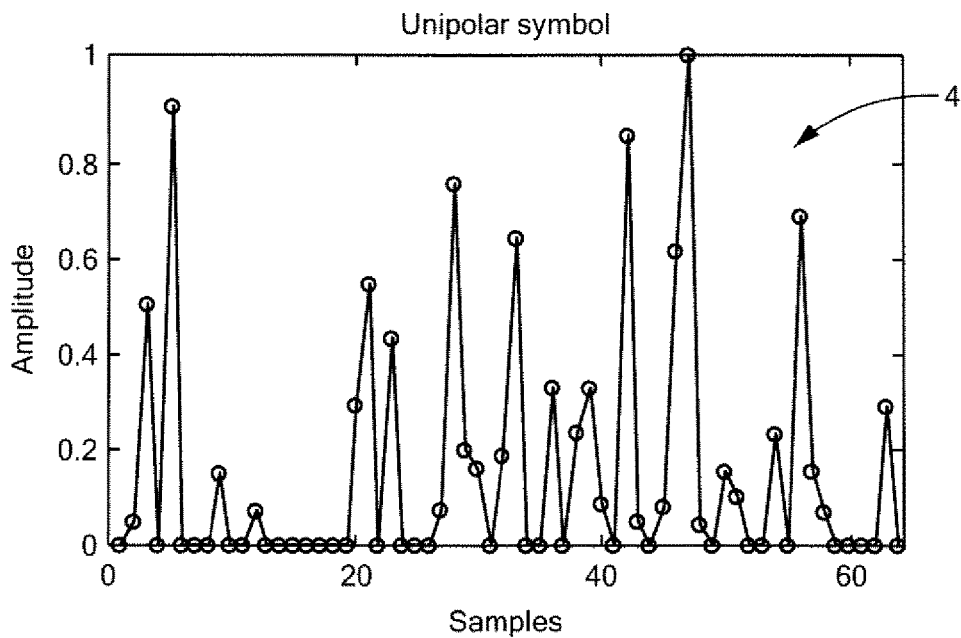
FIG. 2 is an example of a plot depicting a typical unipolar symbol.

The bipolar nature of OFDM signals introduces an additional problem in VLC because LEDs can only convey unipolar signals, e.g., as shown by unipolar symbol 4, FIG. 2, in light intensity.

ACO-OFDM is a power efficient alternative to DCO-OFDM and uses the properties of the fourier transform and asymmetrical clipping to create real and unipolar symbols, e.g., in the time domain. Because ACO-OFDM uses only positive samples, it has one-half the spectral efficiency of DCO-OFDM and one-fourth the spectral efficiency of RF-OFDM.

Figure 3A:
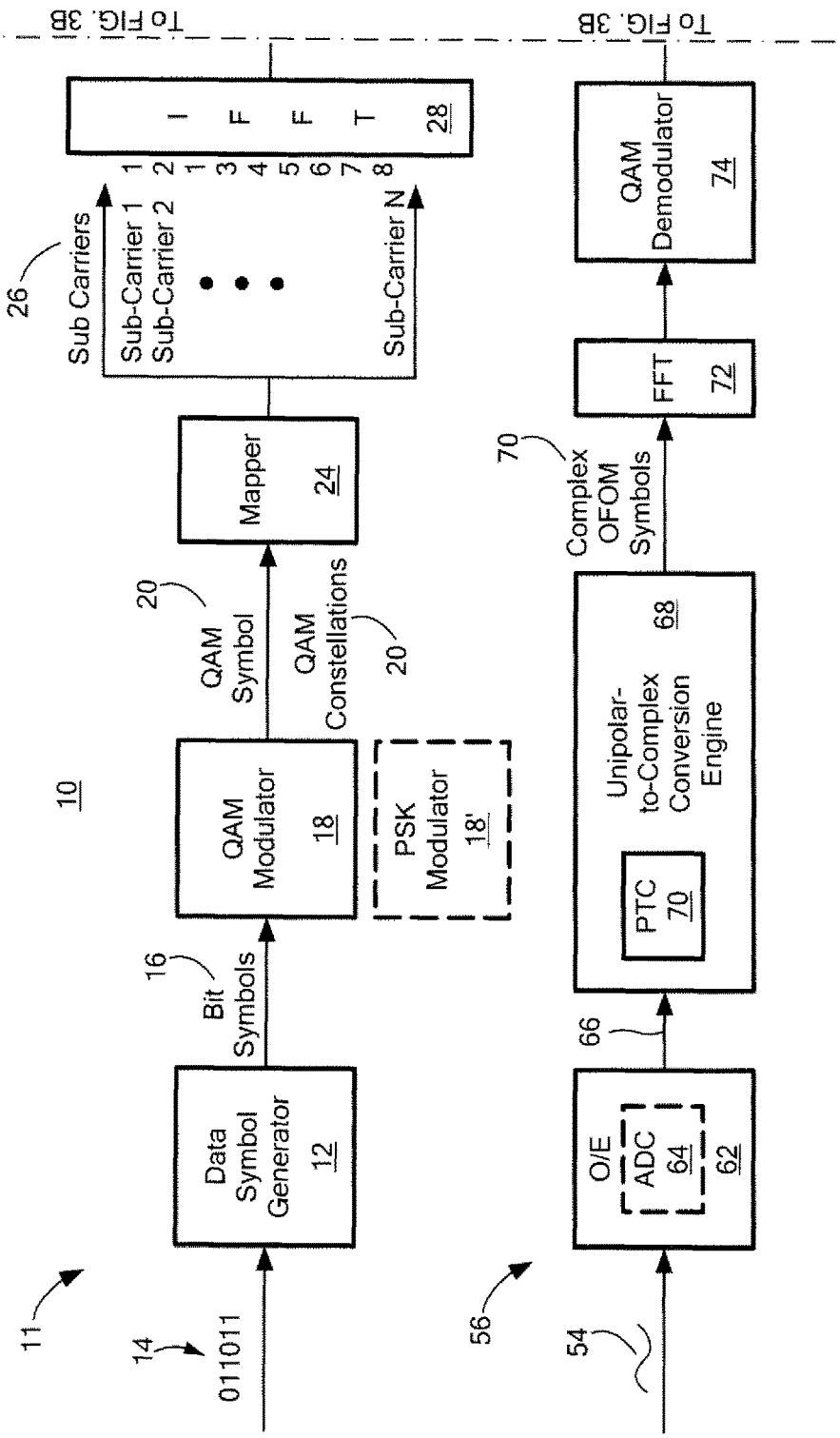
FIGS. 3A-3B are schematic block diagrams showing the primary embodiments of one embodiment of the system and method for embedding phase and amplitude into a real-valued unipolar signal of this invention.
Figure 3B:
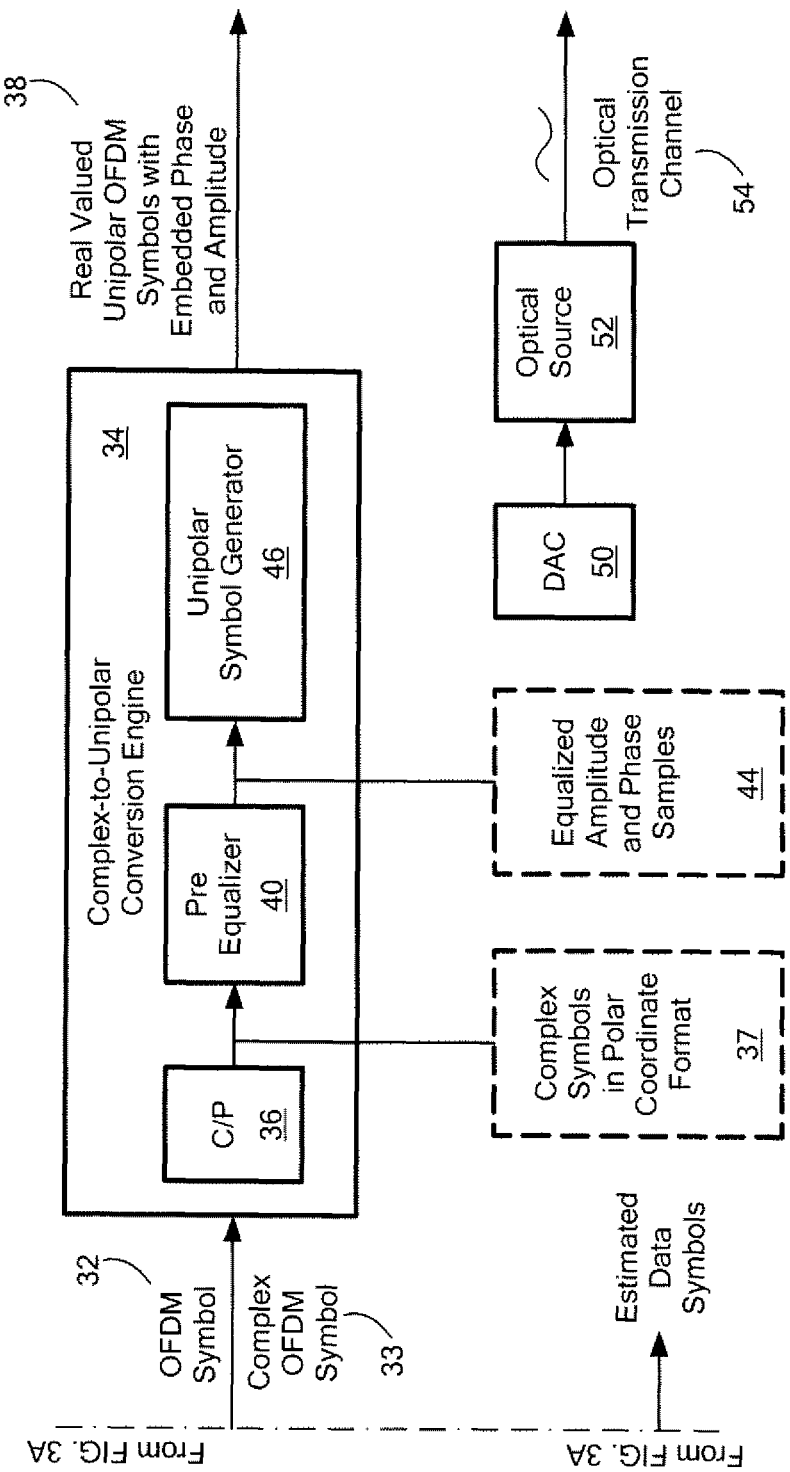
Figure 4:
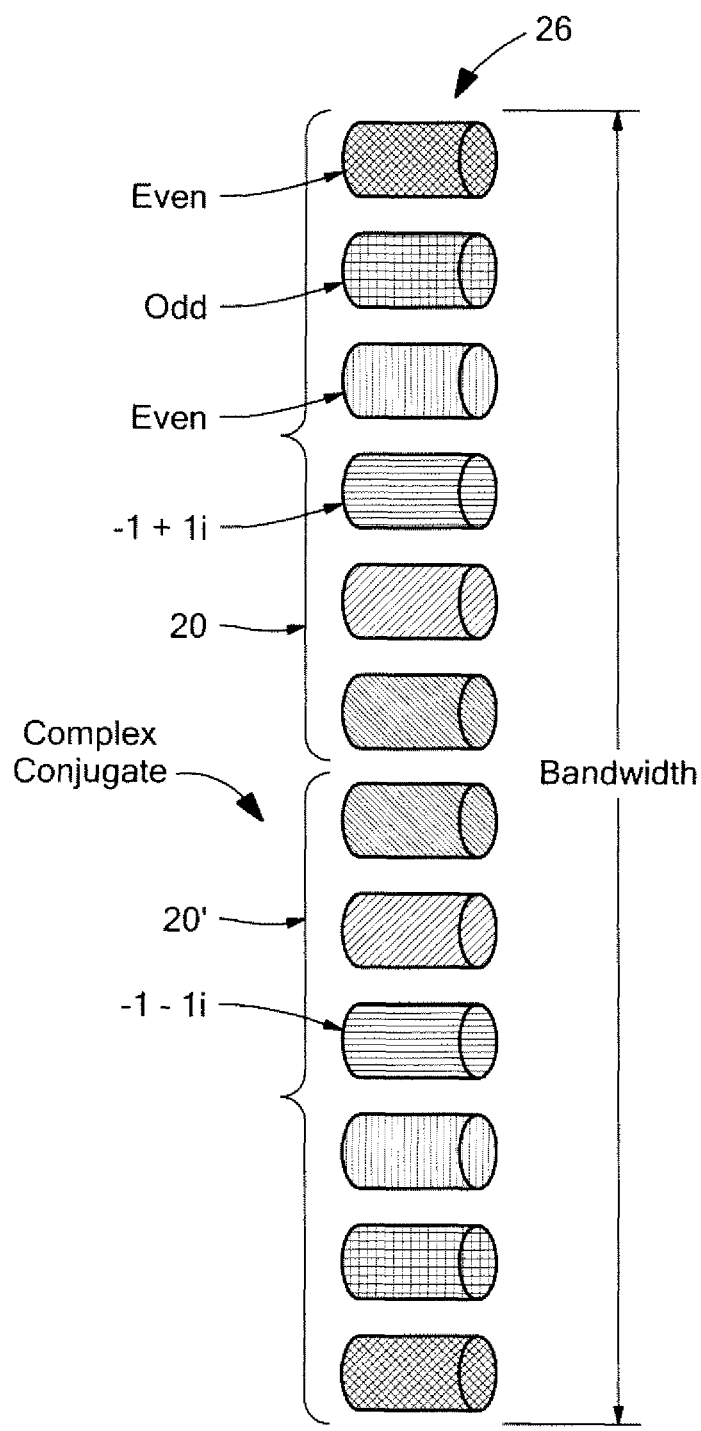
FIG. 4 is a schematic block diagram showing an example of a QAM constellation and the complex conjugate of the QAM constellation.

There is shown in FIGS. 3A-3B a typical optical transmission system 10 used for optical transmission of complex signals. System 10 includes optical transmitter 11 which includes conventional symbol generator 12 which receives data bit stream 14 comprised of zeroes and ones. Data symbol generator 12 inputs data bit stream and outputs bit symbols 16. A symbol is made up of multiple bits of zero and one. Quadrature amplitude modulation (QAM) modulator 18 inputs bit symbols 16 and outputs complex QAM symbols 20, also called QAM constellations. QAM symbols or constellations 20 are in Cartesian format. Mapper 24 is responsive to QAM constellations 20 and assigns the QAM constellations 20 or redundant complex conjugate QAM constellation 20', FIG. 4, where like parts have been given like numbers, using Hermitian symmetry to sub-carriers 26, FIGS. 3 and 4. Sub-carriers 26 include sub-carrier$_1$, sub-carrier$_2$ . . . sub-carrier$_N$ for a particular bandwidth as shown in FIG. 4. In the example shown in FIG. 3A, there are 8 sub-carriers 26. FIG. 5 shows in further detail examples of 2 bits per constellation or 4-QAM, indicated at 27, and 4 bits per constellation or 16-QAM, indicated at 29. In other examples, phase-shift keying (PSK) may be utilized to generate PSK symbols. In this design, PSK modulator 18', FIG. 3A, may similarly be utilized. Graph 31, FIG. 6, shows the relationship between power, frequency, bandwidth and sub-carriers 26, FIGS. 3A and 4.

As discussed above, when Hermitian symmetry is used with DCO-OFDM and ACO-OFDM, half of available sub-carriers 26 are utilized to carry the data part of the complex QAM symbols and the other half of available sub-carriers 26 are used to carry the complex-conjugate QAM constellations as shown in FIG. 4, which reduces the spectral efficiency by one-half when compared to RF-OFDM.

IFFT engine 28, FIG. 3A, receives the QAM constellations on sub-carriers 26 and outputs complex OFDM symbols 32, FIG. 3B.

With both DCO-OFDM and ACO-OFDM, OFDM samples 32 output by IFFT engine 28, FIG. 3A, are real-valued bipolar or real-valued unipolar symbols, respectively. There are no complex samples in the complex OFDM symbols 32, FIG. 3B, that may be used to obtain amplitude and phase information. When RF-OFDM is utilized, IFFT engine 28 outputs complex OFDM symbols 33 where both even and odd sub-carriers carry data. However, as discussed above, RF-OFDM signals cannot be used to directly modulate the instantaneous power of optical carriers.

The result is DCO-OFDM generates real and bipolar symbols 32 at the output of IFFT engine 28 at one-half of the spectral efficiency of RF-OFDM. ACO-OFDM generates real and unipolar symbols 32 at the output of the IFFT engine 28 at one-fourth the spectral efficiency of RF-OFDM. Both are unable to obtain phase and amplitude information from a complex OFDM symbols output by the IFFT engine 28.

Figure 7:
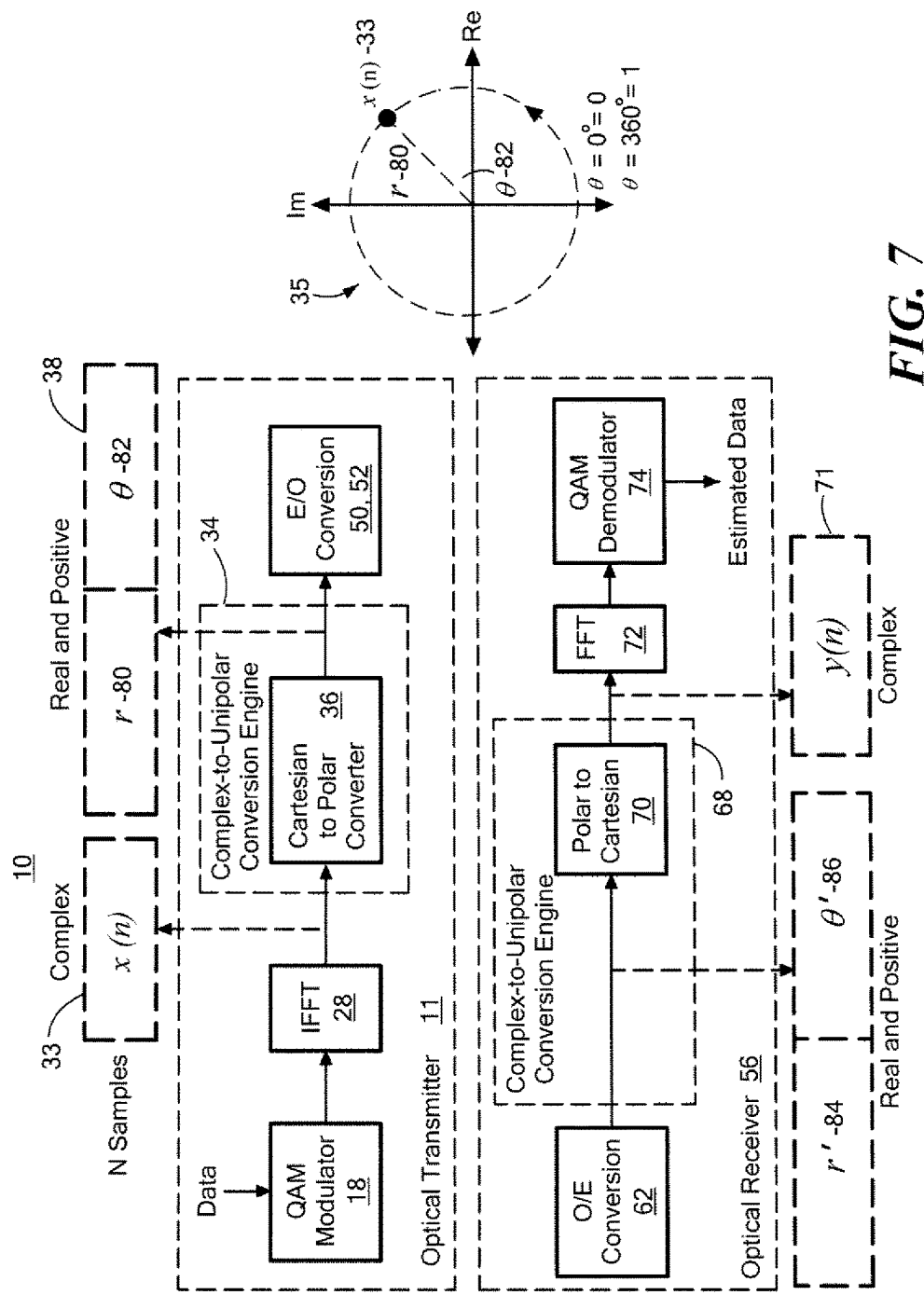
FIG. 7 is another block diagram showing the primary components of the system shown in FIG. 3.

In order to create the real-valued unipolar signal with embedded phase and amplitude information from complex OFDM symbols 33 output by IFFT engine 28 and double the spectral efficiency when compared to ACO-OFDM, optical transmission system 10, FIGS. 3A-3B and 7, of one or more embodiments of this invention includes complex-to-unipolar conversion engine 34 which receives complex OFDM symbols 33 in Cartesian format output by IFFT engine 28, e.g., complex OFDM symbols x(n)-33 (FIG. 7). System 10 uses complex OFDM symbols 33 as found in RF-OFDM and therefore uses both even and odd sub-carriers (discussed below). Complex-to-unipolar conversion engine 34 converts complex OFDM symbols 33 in the Cartesian format to a polar coordinate format and generates real-valued unipolar OFDM symbols 38 with embedded phase θ-82 (FIG. 7) and amplitude r-80 information. See also graph 35, FIG. 7.

Complex-to-unipolar conversion engine 34, FIG. 3B, includes complex-to-unipolar (C/P) converter 36 FIG. 3B, which converts complex OFDM symbols 33 from the Cartesian format to a polar coordinate format. Complex-to-unipolar conversion engine 34 also includes pre-equalizer 40 which is responsive to complex symbols in polar coordinate format 37 and sets the values of the phase θ and amplitude r of individual samples of complex symbols in polar coordinate format 37 to optimize bit-error rate under dynamic range operation constraints at a predetermined data rate and outputs equalized amplitude and phase samples 44 having the embedded phase and amplitude information. In one example, a high data rate, high order QAM (high order constellations) symbols are used. As a result, the dynamic range of the amplitude r is increased. The pre-equalizer preferably insures best bit-error performance under the dynamic range operation constraints of the optical source and minimize OFDM symbol distortion. At low data rate, low order QAM symbols (low order constellations) are used. As a result, the dynamic range of the amplitude r is decreased. Pre-equalizer 40 ensures best bit-error performance under the dynamic range operation constraints of the optical source to maximize the quality of the OFDM signal (maximize the signal to noise ratio).

Complex-to-unipolar conversion engine 34 also includes unipolar symbol generator 46 which inputs equalized amplitude and phase samples 44 and generates real valued unipolar OFDM symbols 38 with embedded phase and amplitude information. Although as discussed thus far, the output of complex to unipolar converter 34 is a real valued unipolar OFDM symbols with embedded phase and amplitude information, real valued unipolar OFDM symbols 38 are not limited to real valued OFDM symbols, as the real valued unipolar symbols may be any type of complex symbols used for intensity modulation, such as single-carrier frequency domain-equalization (SC-FDE) symbols.

Real-valued unipolar OFDM symbols 38 with embedded amplitude and phase are then input to digital-to-analog (DAC) converter 50 which generates analog signals for optical transmission. As discussed above, optical transmission system 10 with optical transmitter 11 with data symbol generator 12, QAM modulator 18, mapper 24, IFFT engine 28 and DAC 50 are conventional devices. Thus, complex-to-unipolar conversion engine 34 can easily be integrated with existing optical transmitters. QAM modulator 18, mapper 24, and IFFT engine 28 are used in a unique way as discussed below.

Mapper 24, FIG. 3A, in one embodiment of this invention, is responsive to QAM symbols or constellations 20 and the assigns QAM symbols to all sub-carriers 26 in IFFT engine 28 without Hermitian symmetry to provide twice the spectral efficiency when compared to ACO-OFDM. Because complex-to-polar conversion engine 36 converts complex OFDM symbols 32 from Cartesian format to polar format to obtain the real values, the complex conjugate of QAM constellations 20 output by QAM modulator as shown in FIG. 4 do not need to be created, as is done in ACO-OFDM and DCO-OFDM. Thus, mapper 24 can utilize all available sub-carriers 26, e.g., both even and odd sub-carriers as found in RF-OFDM to transmit QAM constellations 20 which results in a doubling of the spectral efficiency when compared to ACO-OFDM. In one example, amplitudes r of different samples of real valued unipolar QAM symbols are transmitted on one half of a period and phase θ of different samples of the real valued unipolar QAM symbols are transmitted on the other half of the period. IFFT engine 28 is responsive to the assigned QAM symbols on sub-carriers 26 and outputs complex OFDM symbols 33. The transmitted signals output by DAC 50 drives optical source 52 for optical transmission 54 to optical receiver 56 as shown. After the electrical-to-optical (O/E) conversion by O/E-62 with analog-to-digital (ADC) converter 64, the received signals output by ADC-64 by line 66 representing the real valued unipolar symbols with embedded phase θ'-86, FIG. 7, and amplitude r'-84 information of the transmitted symbols are input to unipolar-to-complex conversion engine 68, FIGS. 3A and 7, with polar-to-Cartesian converter 70. Polar-to-Cartesian converter 70 converts the symbols on line 66 in the polar coordinate format back to the Cartesian coordinate format and outputs complex OFDM symbols y(n)-71 (FIG. 7). The generated N output complex samples of OFDM symbols 70 are then processed using the Fast Fourier Transform (FFT) engine 72. QAM demodulator 74 estimates the transmitted data symbols from the complex symbols output by FFT 74.

The result is complex-to-unipolar conversion engine 34 for optical transmitter 11 outputs real valued unipolar OFDM symbols 38 with embedded phase and amplitude information and operates at twice the spectral efficiency of ACO-OFDM and has the same spectral efficiency of the bipolar (DCO-OFDM) while avoiding the necessity for DC biasing.

Figure 8:
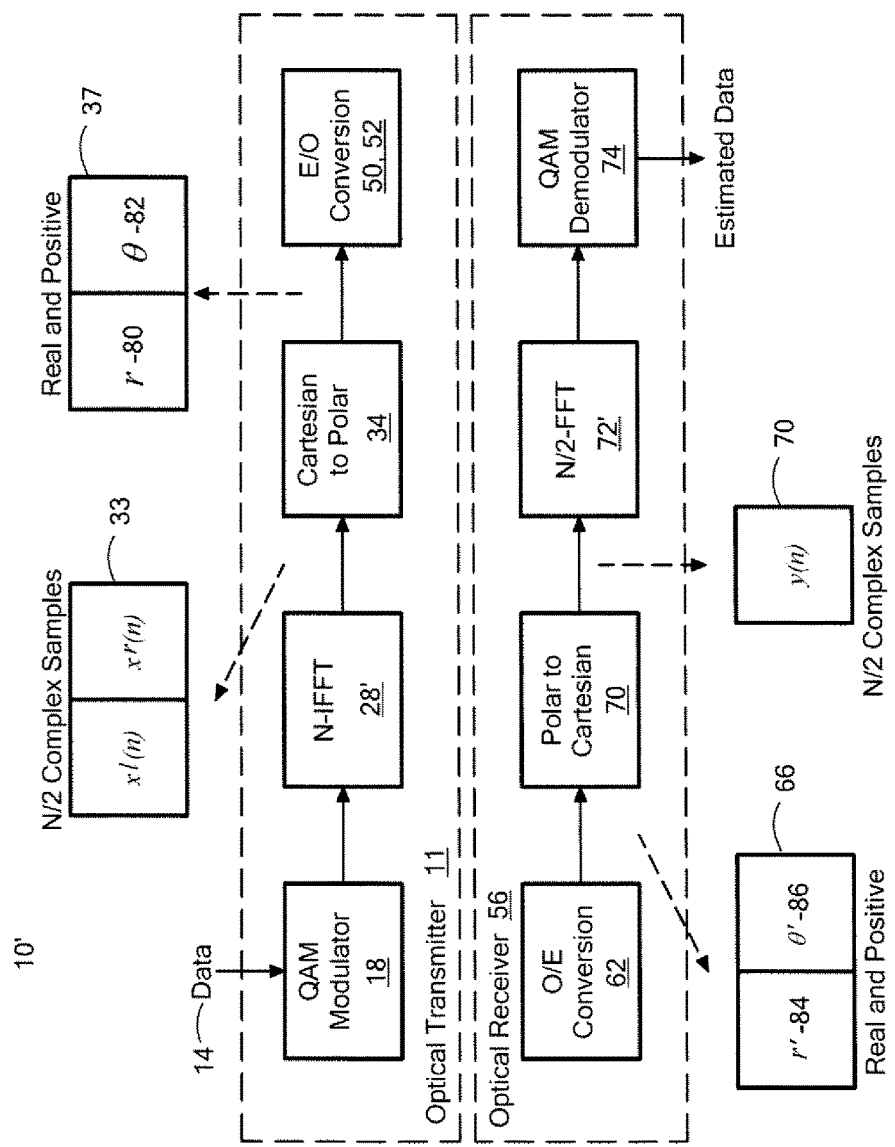
FIG. 8 is a schematic block diagram of another embodiment of the system and method for embedding phase and amplitude into a real-valued unipolar signal of this invention.

System 10', FIG. 8, where like parts have been given like numbers, for embedding phase and amplitude into a real-valued unipolar symbol for another embodiment of this invention uses mapper 24, FIG. 3A, in a different way. In this embodiment, mapper 24 is responsive to QAM symbols or constellations 20 and assigns QAM symbols only to even sub-carriers 26 in N-IFFT engine 28', FIG. 8, with no Heimitian symmetry to provide twice the spectral efficiency when compared to ACO-OFDM. The output of the N-IFFT engine 28' has a useful symmetry called half-wave even symmetry. In half-wave even symmetry, the N/2 useful output complex samples of the first half of the OFDM symbol period are repeated again (redundant complex samples) during the other half of the period. Calculating only N/2 useful complex samples reduces the computational time of the N-IFFT engine 28' by half. The result is only half the time is required to transmit one complex OFDM symbol. Thus, the same time is required to transmit real-valued unipolar OFDM symbols 38 as discussed above for system 10 discussed above with reference to FIGS. 3A-3B and 7. At the optical receiver 56, the generated N/2 output complex samples of OFDM symbols 70 are then processed using N/2 FFT engine 72'. Thus, this embodiment, the complexity of the N/2-FFT engine 72' is reduced by half compared to the first embodiment.

Figure 9:
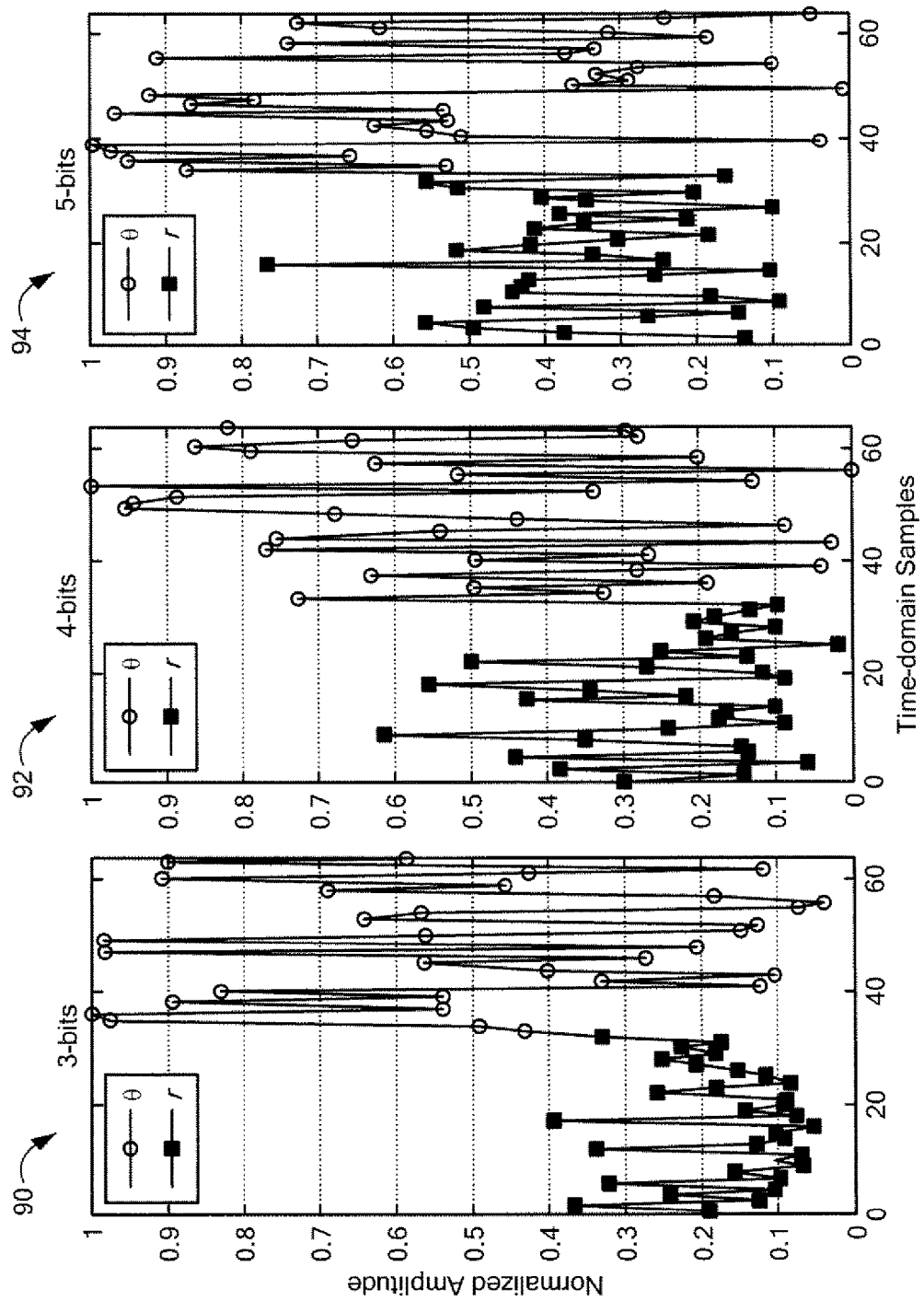
FIG. 9 shows plots of time samples of the real-valued unipolar symbols with embedded phase and amplitude shown in one or more of FIGS. 3A-3B, 7 and 8, using 3-bits, 4-bits, and 5-bits per subcarrier.
Figure 10:
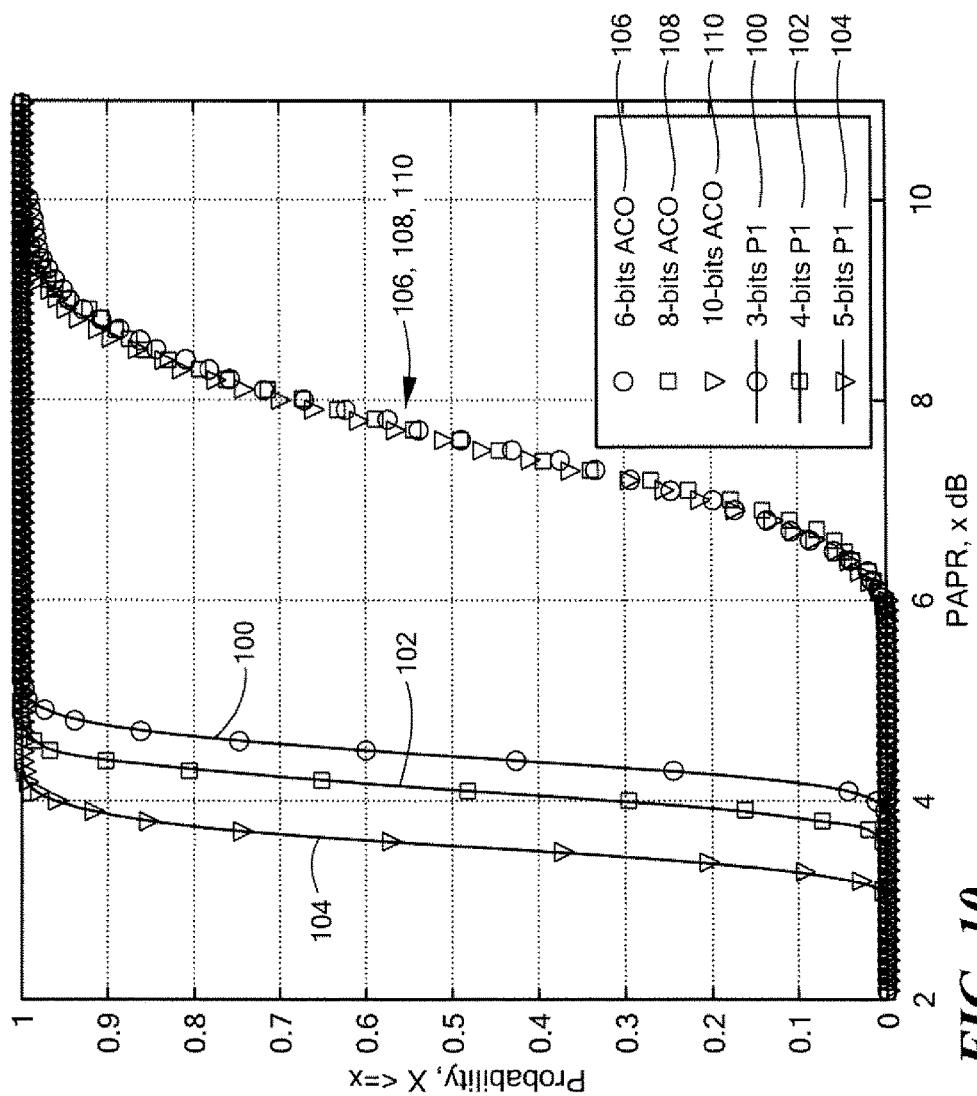
FIG. 10 depicts CDF plots of peak-to-average power ratio (PARP) for the real-valued unipolar symbols with embedded phase and amplitude shown in one or more of FIGS. 3A-3B, 7 and, and compared to ACO-OFDM.
Figure 11:
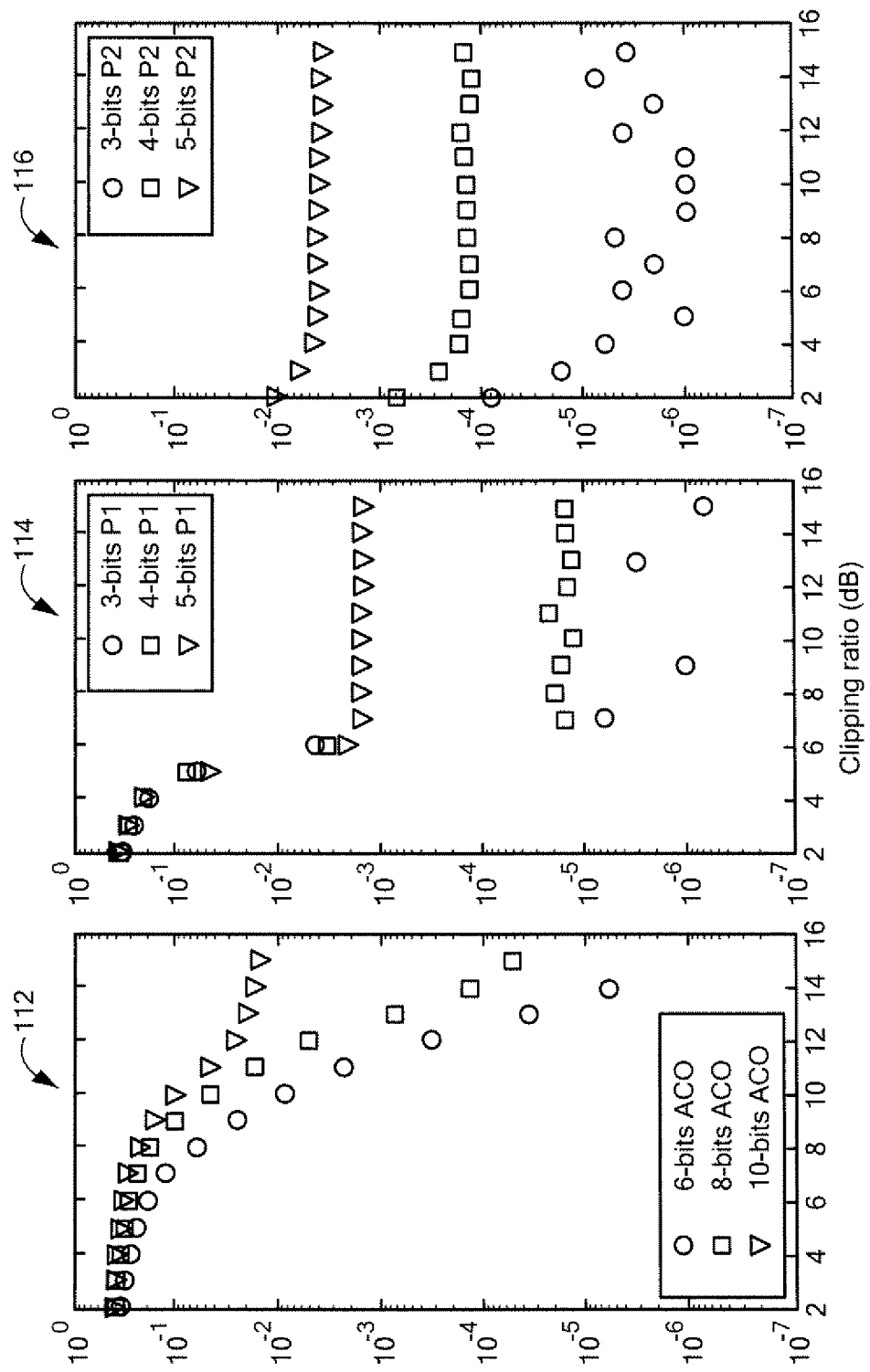
FIG. 11 shows plots depicting the real-valued unipolar symbols with embedded phase and amplitude shown in one or more of FIGS. 3A-3B, 7 and 8 offer improved bit error rate (BER) performance for clipping ratio as low as 2 dB.

Monte-carlo simulations were conducted to compare the peak-to-average power ratio (PAPR) of real-valued unipolar symbols 38 with embedded phase and amplitude generated by complex-to-unipolar conversion engine 34 shown in one or more of FIGS. 3A-3B, 7 and 8 with that of ACO-OFDM. FIG. 9 shows examples of the time samples of real-valued unipolar symbols 38, FIGS. 3 and 7, with embedded phase θ and amplitude r using 3-bits, 4-bits and 5-bits per sub-carrier, indicated by plots 90, 92 and 94, respectively. As can be seen, independent on the modulation order, the envelope of the θ samples is limited to 1 which corresponds to θ=360°. Higher peaks for r samples are obtained at high order constellations. FIG. 10 depicts an example of the cumulative distribution function (CDF) plots of the peak-to-peak average power ratio (PAPR) for real-valued unipolar symbols 38 with embedded phase and amplitude, indicated at 100, 102, 104 and ACO-OFDM indicated at 106, 108, 110. As can be seen, real-valued unipolar symbols 38 with embedded phase and amplitude has low PAPR when compared with ACO-OFDM for the same number of sub-carriers. In real-valued unipolar symbols 38 with embedded phase and amplitude, the PAPR is lower for high order constellations. The influence of the dynamic-range of the optical source on bit error rate (BER) curves was also investigated. In this example, additive white Gaussian noise (AWGN) of −15 dBm and perfect synchronization between the transmitter 11, FIGS. 3A-3B and 7, and the receiver 56 was assumed. Two approaches were conducted to allocate energy to samples of r and θ. The first approach, "P1-OFDM", a scaling factor m is directly applied to set the average power per OFDM symbol. In the second approach, "P2-OFDM", a balanced energy spread "power balance approach" is ensured before applying m. It was confirmed that at the same data rate, real-valued unipolar symbols 38 with embedded phase and amplitude offers superior BER performance for clipping ratio as low as 2 dB, as shown in FIG. 11, where the clipping ratio is defined in dB as 10 $\log_{10}$(dynamic range/average power per OFDM symbol). For ACO-OFDM using 10-bits per sub-carrier as shown in plot 112, the BER floor is above the forward error correction (FEC) limit.

For real-valued unipolar symbols 38 with embedded phase and amplitude, a clipping ratio of 6 dB is sufficient to achieve BER of $10^{-3}$ for 5-bits per sub-carrier, i.e., corresponds to 10-bits using ACO-OFDM. As shown by plots 114 and 116, using real-valued unipolar symbols 38 with embedded phase and amplitude, BER of $10^{-3}$ for 5-bits per sub-carrier was achieved at 4 dB clipping ratio. A clipping ratio of 2 dB supports BER below $10^{-3}$ for 4-bits and 3-bits per sub-carrier.

Thus, in accordance with one or more embodiments of system 10 with complex-to-unipolar conversion engine 34, a BER lower than FEC limit is maintained while maximizing data rate even under a narrow dynamic-range of the optical source. In addition, using a power balance approach is shown to bring a significant BER performance even under narrower dynamic-range of the optical source as low as 2 dB clipping ratio.

One or more embodiments of system 10 and the method thereof for embedding phase and amplitude to a real valued unipolar signal provides a novel foimat of OFDM which provides real valued unipolar symbols with embedded phase and amplitude information suitable for IM which doubles the spectral efficiency of ACO-OFDM and offers the same spectral efficiency of the bipolar format (DCO-OFDM) while avoiding the necessity for DC biasing.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A system for embedding phase and amplitude into a real-valued unipolar signal suitable for intensity modulation (IM) by an optical transmitter, the system comprising:
    a data bit generator responsive to a data bit stream configured to generate data bit symbols;
    a quadrature amplitude modulator (QAM) responsive to the data bit symbols configured to generate QAM symbols;
    a mapper responsive to the QAM symbols configured to assign the QAM symbols to all sub-carriers of an Inverse Fourier Transform (IFFT) engine operation with no Hermitian symmetry to double spectral efficiency;
    the IFFT engine responsive to the assigned QAM symbols to all the sub-carriers configured to output complex orthogonal frequency division multiplexing (OFDM) symbols;
    a complex-to-unipolar conversion engine including:
    a Cartesian-to-polar converter configured to receive the complex OFDM symbols in Cartesian format output by the IFFT engine and convert the complex OFDM symbols from the Cartesian format to a polar coordinate format,
    a phase and amplitude pre-equalizer responsive to the complex OFDM symbols in the polar coordinate format configured to set values of phase and amplitude of individual samples of the complex OFDM symbols in the polar coordinate format in order to optimize bit error rate under dynamic range operation constraints at a predetermined data rate and output equalized amplitude and phase samples having an embedded amplitude and phase,
    wherein amplitudes of different samples of complex valued OFDM symbols are transmitted on one half of a period and phases of different samples of complex valued OFDM symbols are transmitted on the other half of the period; and
    a unipolar symbol generator configured to generate real-valued unipolar OFDM symbols, including embedded phase and amplitude information, of the complex OFDM symbols in the Cartesian format without a need for Hermitian symmetry, and
    the optical transmitter configured to generate an output optical signal including the real-valued unipolar OFDM symbols generated by the unipolar symbol generator.

2. The system of claim 1 further including a phase-shift keying (PSK) modulator responsive to the data bit symbols configured to generate complex PSK symbols.

3. The system of claim 1 further including a mapper responsive to the QAM symbols configured to assign the QAM symbols only to even sub-carriers to the IFFT engine operation with no Hermitian symmetry to double the spectral efficiency.

4. The system of claim 3 in which the IFFT engine responsive to the assigned QAM symbols to the even sub-carriers configured to output the complex OFDM symbols using half-wave even symmetry to reduce the time required to transmit complex OFDM symbols.

5. The system of claim 1 further including a digital-to-analog converter configured to convert the real-valued unipolar OFDM symbols with the embedded phase and amplitude information to analog signals.

6. The system of claim 5 further including an optical receiver including an analog-to-digital converter responsive to the analog signals configured to convert the analog signals to digital symbols representing the real-valued unipolar OFDM symbols with the embedded phase and amplitude information.

7. The system of claim 6 further including a unipolar-to-complex conversion engine configured to convert the digital symbols representing the real-valued unipolar OFDM symbols with the embedded phase and amplitude information into complex OFDM symbols.

8. The system of claim 7 in which the unipolar-to-complex conversion engine includes a polar-to-Cartesian converter configured to convert the digital symbols representing the real-valued unipolar OFDM symbols with the embedded phase and amplitude information in the polar coordinate format to Cartesian format.

9. A method for embedding phase and amplitude into a real-valued unipolar signal suitable for intensity modulation (IM) by an optical transmitter, the method comprising:
    receiving a data bit stream and generating bit symbols;
    receiving the bit symbols and generating quadrature amplitude modulator (QAM) symbols;
    receiving the QAM symbols and assigning the QAM symbols to all sub-carriers of an Inverse Fourier Transform (IFFT) engine operation with no Hermitian symmetry to double spectral efficiency;
    the IFFT engine responsive to the assigned QAM symbols to all the sub-carriers configured to output complex orthogonal frequency division multiplexing (OFDM) symbols;
    receiving the complex OFDM symbols in Cartesian format output by the IFFT engine; and converting the complex OFDM symbols from the Cartesian format to a polar coordinate format using a Cartesian-to-polar converter;

receiving the complex OFDM symbols in the polar coordinate format and setting values of phase and amplitude of individual samples of the complex OFDM symbols in the polar coordinate format in order to optimize bit rate error under dynamic range operation constraints at a predetermined data rate and output equalized amplitude and phase samples having an embedded amplitude and phase using a phase and amplitude pre-equalizer;

wherein amplitudes of different samples of complex valued OFDM symbols are transmitted on one-half of a period and phases of different samples of complex valued OFDM symbols are transmitted on the other half of the period;

generating real-valued unipolar OFDM symbols, including embedded phase and amplitude information, of the complex OFDM symbols in Cartesian format without a need for Hermitian symmetry using a unipolar symbol generator; and generating an output optical signal including the real-valued unipolar OFDM symbols generated by the unipolar symbol generator using the optical transmitter.

* * * * *